United States Patent
Niemela et al.

(10) Patent No.: US 6,834,078 B1
(45) Date of Patent: Dec. 21, 2004

(54) TEST FACILITY FOR TRANSCEIVER STATION

(75) Inventors: Kari Niemela, Oulu (FI); Jari Pekkarinen, Hampshire (GB)

(73) Assignee: Nokia Networks Oy, Espoo (FI)

(*) Notice: Subject to any disclaimer, the term of this patent is extended or adjusted under 35 U.S.C. 154(b) by 371 days.

(21) Appl. No.: 09/600,951

(22) Filed: Jul. 19, 2000

Related U.S. Application Data

(63) Continuation of application No. PCT/EP98/07777, filed on Nov. 30, 1998.

(51) Int. Cl.⁷ .............................. H04B 3/48; H04B 1/38
(52) U.S. Cl. ........................ 375/224; 375/219; 375/221; 375/141; 370/249
(58) Field of Search ................................ 375/130, 133, 375/141, 221, 224, 227, 219, 259, 358; 370/355, 342, 249

(56) References Cited

U.S. PATENT DOCUMENTS

| | | | |
|---|---|---|---|
| 4,759,034 A | * | 7/1988 | Nagazumi .................... 375/142 |
| 5,446,756 A | * | 8/1995 | Mallinckrodt ............... 375/130 |
| 5,461,639 A | | 10/1995 | Wheatley, III et al. |
| 5,574,981 A | | 11/1996 | Ahonen |
| 6,160,803 A | * | 12/2000 | Yuen et al. .................. 370/342 |
| 6,272,168 B1 | * | 8/2001 | Lomp et al. ................. 370/342 |

FOREIGN PATENT DOCUMENTS

| | | |
|---|---|---|
| EP | 0 682 418 | 11/1995 |
| EP | 0 769 857 A2 * | 4/1997 |
| JP | 02 155325 | 9/1990 |
| WO | 91/19364 | 12/1991 |
| WO | 98/37650 | 2/1998 |

* cited by examiner

Primary Examiner—Young T. Tse

(57) ABSTRACT

Test circuitry for a transceiver is described which allows tests to be conducted on a transmission loop without requiring decoding by rake fingers. According to one embodiment, a receiver for receiving a test signal includes a detecting circuit set up in accordance with a test spreading code for detecting whether or not signals received by the receiver include the test signal incorporating the test spreading code. In the embodiment, a matched filter set up according to the test spreading code is utilized as the detecting circuit. According to another embodiment, circuitry for adjusting the power level of a test signal is described in which power control information is transferred between first and second storage locations at the transceiver to allow otherwise normal control circuits to implement the power control.

10 Claims, 3 Drawing Sheets

TEST FACILITY FOR TRANSCEIVER STATION

This application is a continuation of international application serial No. PCT/EP98/07777, filed 30 November 1998.

BACKGROUND OF THE INVENTION

1. Field of the Invention

The present invention relates to test facilities for transceiver stations, particularly but not exclusively W-CDMA transceivers for use in mobile communication networks.

2. Description of the Related Art

It is common practice to monitor a transceiver in a base station in order to detect possible malfunctions. If a malfunction occurs during a transceiver's normal operation, information about the malfunction is reported to the base station controller which can then take the necessary actions in order to limit the harm caused to the base station system or a mobile telephone system. Furthermore it is useful to be able to functionally test a transceiver without connecting it into a mobile telephone network. Particular complications arise in a CDMA system, because it is not possible to definitely determine whether a receive signal is the same as a transmitted signal based just on the input power of the receiver, since all information signals lie on top of each other at the same frequency and, furthermore, received power does not in any event indicate the condition of the digital transmitter parts. While some previous test proposals have used a bit error rate of comparing received bits to transmitted ones, in a CDMA system in order to be able to calculate the bit error rate, the receive signal has to be completely despread. This is a rather complicated process and involves the base-band parts where rake receivers are placed. These parts are typically located separately from the transceiver. Therefore, it is difficult to test transceiver components alone because any results will inevitably be affected by the rate receiver parts used for the despreading.

SUMMARY OF THE INVENTION

According to one aspect of the invention there is provided test circuitry for a transceiver comprising: a transmitter for transmitting a test signal incorporating a test spreading code; a receiver for receiving said test signal, said receiver including detecting means set up in accordance with said test spreading code for detecting whether or not signals received by the receiver include the test signal incorporating said test spreading code.

There is also provided a method of carrying out a test in a transceiver, the method comprising: applying a test spreading code to a test signal and transmitting said test signal; feeding back a test sample of said test signal to a receiver; at the receiver, setting up detecting means in accordance with said test spreading code; and detecting whether or not said test sample includes said test signal by checking for a match at said detecting means.

In accordance with the described embodiment, a matched filter is used to determine whether or not the transmitted signal has passed the whole transceiver's transmitter-receiver chain, without the need to complete despreading functions on the signal. The test spreading code can be a synchronisation code already available in a W-CDMA system. The test method can be used in conjunction with bit error rate measurements, but when it is used on its own it has the advantage that it tests only the transceiver components and does not require passage of the signal through the rake finger parts.

Thus, the described embodiments of the invention have the advantage that a W-CDMA transceiver can be tested without the rake receiver, and the receiver test functions can determine definitely that the received signal is the transmitted one. The synchronisation codes are well defined in a W-CDMA system and readily available, so this test feature does not reduce the capacity of the system.

It is advantageous in a test system of this type to properly control the power level of the test signal. Thus, according to a further aspect of the invention there is provided circuitry for adjusting the power level of a test signal in a transceiver test loop, comprising: a first storage location which holds power control information to be transmitted as an RF signal; a second storage location which, in a normal mode of operation, holds power control information received in an RF signal which is used to control the transmitted power level of the transmitted signal; and a switch for selectively transferring the power control information from the first storage location to the second storage location in a test mode of operation. This aspect of the invention also provides a method for adjusting the power level of a test signal in a transceiver test loop, the method comprising: receiving a test signal and determining a signal to information ratio of said test signal; generating power control information in dependence on said determined signal to information ratio, and loading said power control information into a first storage location; transferring the power control information from said first storage location to a second storage location from which the power control information is used to control the transmitted power level for a subsequent test signal.

It is possible to implement two levels of power control. A long term automatic gain control can be implemented by using some sort of previous knowledge of conversion loss of the test loop, based on calibration data, transmitted mean power and receiver mean power. This can be implemented by an attenuator on the receive side which attenuates the fed-back test sample.

In addition, a so-called fast automatic gain control can be implemented using the method and circuitry as hereinabove defined. In normal operation, the first storage location holds the downlink power control bit for transmission to a mobile station, while the second storage location holds the uplink power control bit which is normally received from the mobile station and used to adjust downlink power. According to the embodiment of the invention described herein, a swapping method is used to change the uplink AGC bit to adjust the downlink power in a test loop.

A further aspect of the invention provides a transceiver for implementing a test loop, the transceiver comprising: a receiving mixer for converting a test signal from a transmitting frequency to a receiving frequency; a local oscillator for generating a conversion signal for the mixer; a first power adjustment means for adjusting the power level of the received test signal prior to conversion of the mixer; and a second power adjustment means for adjusting the power level of the transmitted test signal based on the signal to information ratio of the received test signal.

BRIEF DESCRIPTION OF THE DRAWINGS

For an better understanding of the present invention and to show how the same may be carried into effect, reference will now be made by way of example to the accompanying drawings in which.

DETAILED DESCRIPTION OF THE INVENTION

Figure 1:
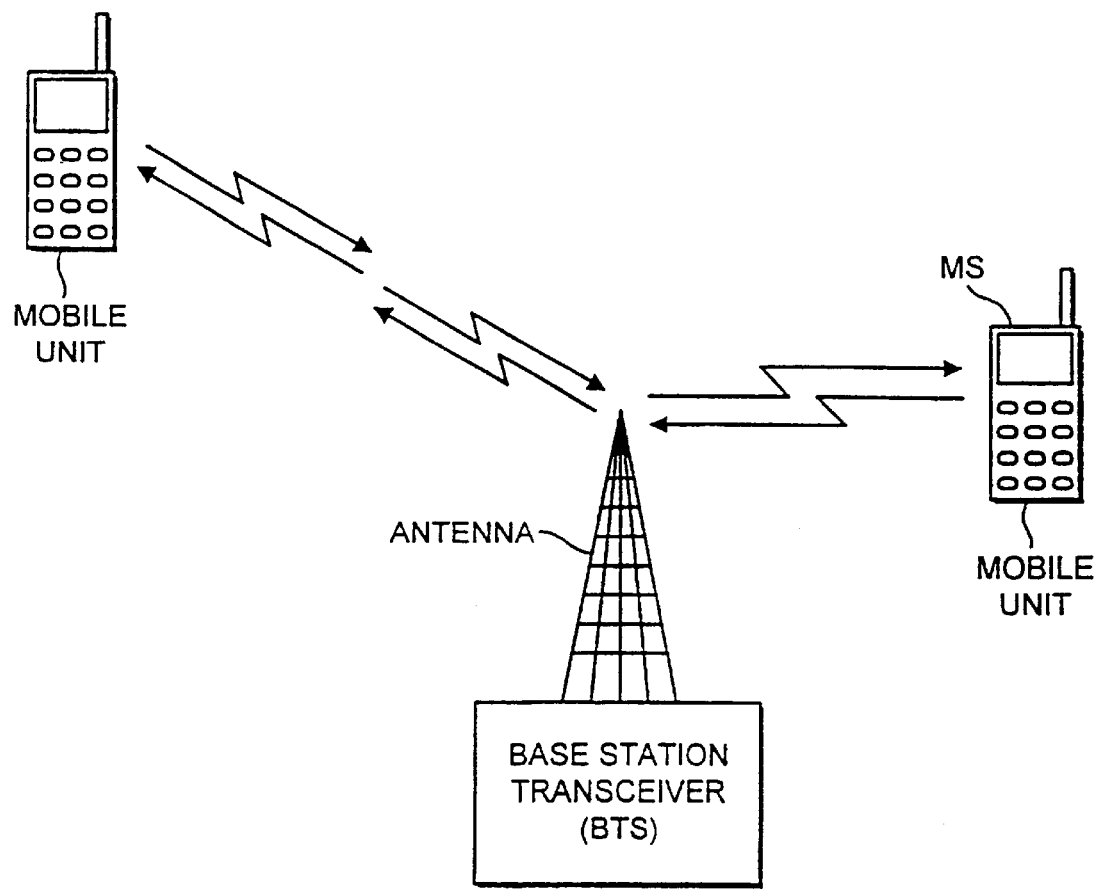
FIG. 1 is a block diagram showing a general mobile communications system.

FIG. 1 shows a general communications system within which the present invention may be implemented. Such a system comprises a base station transceiver (BTS) and one or more mobile stations (MS) communication with the base station via RF signals.

Figure 2:
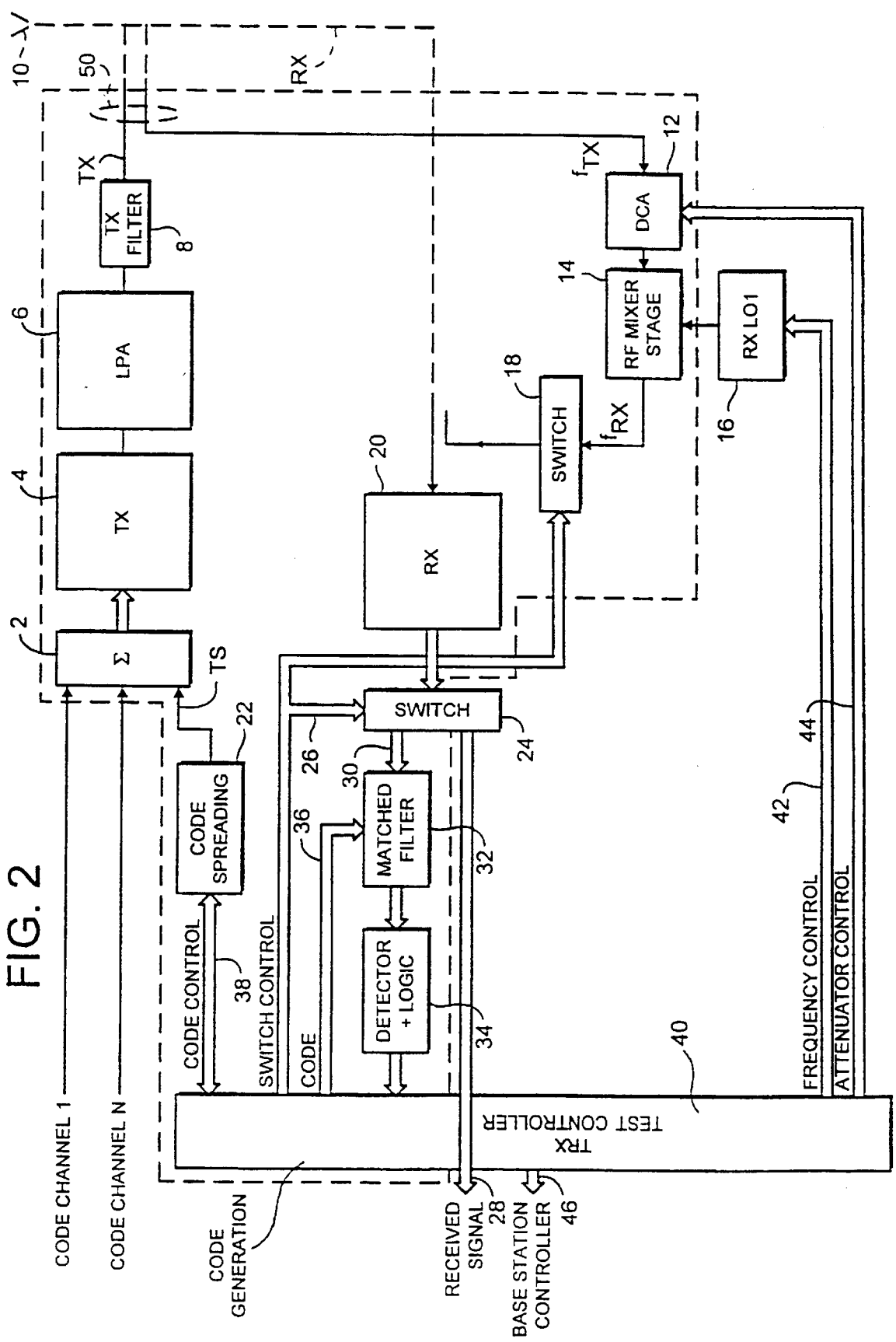
FIG. 2 shows a base station architecture for performing the method of one aspect of the present invention.

The base station is capable of simultaneously transmitting and receiving signals to and from a number of mobile stations. FIG. 2 is a block diagram showing the internal components of the base station transceiver relevant to the first embodiment of the invention described herein. The base station can be considered to have three main blocks, each of which are comprised of a number of sub-components. The three main blocks are the transmitter, the receiver and the control circuitry. As can be seen, the control circuitry is connected to both the transmitter and the receiver.

The transmitter comprises a first multiplexor 2 which receives digital signals on a number of different communication channels (code channel 1 . . . code channel N) and multiplexes them into a single signal. The output of the first multiplexor 2 is connected to the input of a transmitter TX block 4 which contains the circuitry necessary to convert the multiplexed, digital signal into a transmission RF signal at a particular carrier frequency fc. The output of the TX block 4 is connected to a linear power amplifier LPA 6 and then to a transmission filter 8. The filter has its output connected to an antenna 10.

The receive side comprises a digitally controlled attenuator 12, the output of which is connected to an RF mixer stage 14 which is connected to a local oscillator 16. A switch 18 selectively connects the output of the RF mixer stage 14 to the input of an RX block 20. The RX block 20 contains the necessary circuitry to convert an input RF signal to a digital signal which can be processed by processing circuitry on the receive side.

In operation, the multiplexor 2 receives a number of digital signals on different communication channels each containing information to be transmitted to a particular mobile station. In a CDMA system, each channel is defined by a unique spreading code applied to the signal on that channel. Also input to the multiplexor 2 is an additional test channel spread by a spreading code generated by a code spreading circuit 22 for test purposes as described further herein. The multiplexor 2 combines the signals together such that the output therefrom consists of an information signal for transmission. It is noted at this point that the power level of the information signal is the sum of the power level of each channel.

The information signal is input to the TX block 4 which generates an output signal consisting of an RF carrier signal modulated by the information signal.

The output signal is amplified by the linear power amplifier 6 to levels that will enable it to be transmitted as electromagnetic radiation at an RF frequency over large distances to the relevant mobile stations. The amplified transmission signal TX is then supplied to the filter 8 and from the filter to the antenna 10 where it is radiated out to the mobile stations.

Return signals transmitted by the mobile stations are received as electromagnetic radiation by the antenna and converted into electrical signals (the reception signal RX). The return signal RX comprises a carrier signal modulated by an information signal in a manner similar to the transmission signal TX. In normal operation the received signal RX is fed to the RX block 20 in the receiver which converts the RF analogue signal into a form suitable for processing.

According to a CDMA mobile communication system, each channel (i.e. the establishment of a communications link between the base station and each mobile station) has access to the whole frequency band allocated for transmission in the communications system. Each channel is defined using a particular spreading code which spreads the information signal contained therein over the whole transmission band. A plurality of channels can be transmitted together without losing the coherency of the information contained in each channel.

As is known in the art, in order to extract the information in each channel, the received signal is fed to a set of rake fingers which separate out each of the channels in the received signal using despreading codes which match the spreading code used to define a channel. When the received signal (containing all of the channels each with their own spreading code) is input to the rake fingers, the effect is that only the information signal on the channel defined by the desired spreading code is passed for processing.

In addition to the components already described in the transceiver illustrated in FIG. 2, additional components are provided to implement a test function. These components include a test switch 24 which is connected to the output of the RX block 20 and which is controllable responsive to a switch control signal 26 either to pass the output of the RX block 20 as a received signal for further processing on line 28, or to supply the output of RX block 20 on a test path 30. The test path 30 supplies the output of the RX block 20 to a matched filter 32 the output of which is connected to detector and logic circuitry 34. The matched filter is set up using a spreading code supplied to it along line 36. That spreading code is also supplied to the code spreading circuit 22 along line 38. A test controller 40 generates the code control 38 for the code spreading circuit 22, the switch control 26 for the switch 24 and spreading code 36 for the matched filter 32. It receives the output from the detector and logic circuit 34. In addition, the test controller 40 supplies a frequency control signal 42 for the first local oscillator 16 and an attenuator control signal 44 for the digitally controlled attenuator 12. The test controller 40 has an output 46 to a central controller of the base station.

A test loop will now be described with reference to FIG. 2. A test signal TS is generated which has been spread using a known test spreading code under code control 38. The test code used for spreading the test signal may be one which is used normally, for example a spreading code used in one of the communication system's synchronisation channels, or may be a unique code used expressly for the test loop facility. The same code 36 is also used to set up the matched filter 32.

The test signal TS is up-converted and supplied to the antenna 10 through the transmitter block components 2,4,6 and 8. The test signal may be multiplexed with other communication channels carrying "conventional" information. In other words, the test procedure is not restricted to times of otherwise inactivity of the transceiver and can be performed during normal operation.

A coupler 50 samples part $f_{TX}$ of the transmitted signal TX and supplies it back to the DCA 12 of the receiver. Note that the power level of the transmitted signal TX is dependent on the number of channels being transmitted—it is the sum of the individual channels. The test signal has a power level which is higher than that of each "normal" channel for reasons which will become clear in the following.

The signal sampled by the coupler will be at a very high power level compared with the level of the signals normally received by the receiver, i.e. signals transmitted by mobile stations which may be many miles away. The level of the signal therefore has to be attenuated to levels which can be tolerated by the receiver. The sampled transmission signal (hereafter referred to as the test sample $f_{TX}$) in this input to the attenuator 12 which attenuates the signal prior to down-conversion at the RF mixer stage 14. The attenuation is controlled so that it effectively removes the "normal" channels from the test sample $f_{TX}$ and puts the test signal at a power level commensurate with the "normal" received signals.

The attenuated sample is down-converted by the mixer stage 14 to a frequency within the receiver band by means of a signal generated by the local oscillator 16.

The down-converted test sample, now referred to as $f_{RX}$ is selectively supplied via the switch 18 (under the switch control 26 from the test controller 40) to the RX block 20 which also receives the signals transmitted by any mobile stations still transmitting to the base station.

The output signal from the RX block 20 is fed to the test switch 24 which allows the signal to be fed either to processing circuitry along received signal path 28 for decoding or to the matched filter 32. During a test procedure, of course, the signal will be switched to be fed to the matched filter. At all other times the signal will be switched to be fed to the processing circuitry.

If a spreading code of the test sample $f_{RX}$ matches the code which has been loaded into the matched filter (which it will if the transmitted test sample $f_{TX}$ is within the received signal and has not been distorted) the filter 32 produces a high, impulse-like output signal. If a spreading code of the test sample $f_{RX}$ does not match that of the matched filter, the filter will not produce the characteristic output signal.

The output signal of the matched filter 32 is then passed to the detector and logic circuit 34 which determines if it is sufficient to indicate a match. In order to indicate a match, the level of the impulse-like output signal must exceed a set of threshold level.

In order to implement such a test loop, the power level of the test signal needs to be controlled within certain parameters. That is, the test signal should have a power level above that of the "normal channels" so that the DCA 12 can attenuate the "normal channels" in the test sample $f_{TX}$ while leaving the test sample at a level commensurate with expected received signals RX.

A further improvement to the test signal level can be made as described in the following, with reference to FIG. 3.

In normal operation, information to be transmitted by the base station transmitter to a particular mobile station is encoded by a spreading code as described above together with a power control bit (PWC bit) which is added to the information signal. The PWC bit is conventionally used by the mobile station to increase or decrease its output power level dependent on the signal to information ratio of the signal previously received at the BTS.

According to the improvement described herein, use is made of the PWC bit in the test loop.

Figure 3:
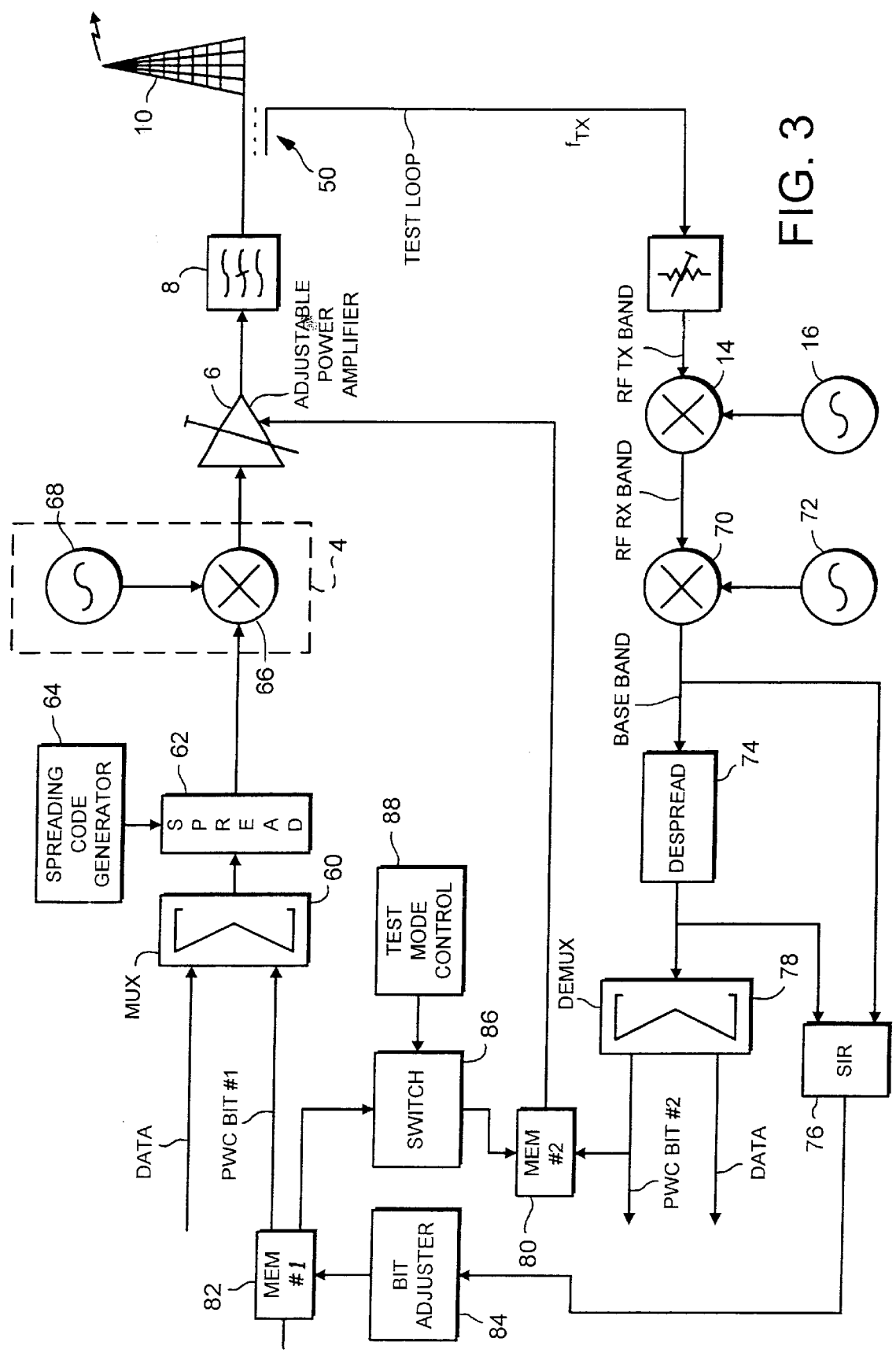
FIG. 3 is a block diagram of the components of a transceiver used to control the output power level of the transmitter during the test procedure of the present invention.

FIG. 3 is a block diagram showing components of a base station transceiver used to control the level of transmitted and received signals. Components which are the same as in FIG. 2 have the same reference numeral. Only one channel is illustrated in FIG. 3 A channel multiplexer 60 receives digital data and a PWC bit PWC BIT #1 and generates the information signal which is passed to a spreader 62 which applies a spreading code generated by a spreading code generator 64. These elements are present in the transceiver of FIG. 3 are not illustrated in FIG. 2. The spread signal is supplied to the TX block 4 which includes a mixer 66 and a local oscillator 68. The output of the mixer 66 is fed to the adjustable power amplifier 6, through the filter 8 and on the antenna 10.

As a practical matter, the adjustable power amplifier 6 can be replaced by a digital power adjuster upstream of the mixer 66.

On the receiver side, the RF mixer stage 14 receives the attenuated signal at the transmission frequency and down-converts it to an IF frequency. A subsequent mixer 70 and oscillator 72 down-converts the IF frequency the base-band and the base-band signal is fed to a despreader 74 which may for example be rake fingers. A signal to interference ratio unit 76 is connected to receive the incoming base-band signal and the output of the despreader 74. The output of the despreader 74 is also supplied to a demultiplexor 78 which separates the received signal into a data portion and a power control bit which is labelled PWC bit #2. That power control bit is of course the power control bit which is received in the information signal on the receive side. In normal circumstances, that power control bit will have been received from a mobile station and will be used by the base station transceiver to modify the power level of the next information signal transmitted to that mobile station. For that purpose, the PWC bit #2 is held in a memory 80 at the base station controller and is used to control the adjustable power amplifier 6 on the transmission side.

The circuit of FIG. 3 also illustrates a memory 82 in which the PWC bit #1 for the information on the transmission side is held prior to transmission. In normal operation, the bit in the memory 82 is set according to the required power level to be set at the mobile station to which the information signal is being transmitted. That is, in normal operation PWC bit #1 is not used for control purposes at the base station transceiver, but is conveyed to the mobile station and is used to control the power level of signals transmitted by the mobile station. Additional circuitry to implement the described embodiment of the invention comprises a bit adjuster 84 which receives the output of the signal to interference ratio unit 76 and is connected to adjust the bit value in the memory 82. In addition, a switch 86 selectively supplies the bit held in the memory 82 to the memory 80, under the control of a test mode controller 88. It will readily be appreciated that many of the components illustrated in FIG. 3 can be incorporated within the test controller 40 of FIG. 2, or can be implemented by hardware/software combinations elsewhere at the base station transceiver. They are illustrated as diagrammatic blocks for ease of explanation.

In normal operation, the data for a particular channel, together with the PWC bit #1 are spread by a spreading code and transmitted out to a particular mobile station. The transmission signal is received by the mobile station which decodes the signal into its constituent parts, namely data and the PWC bit #1.

The mobile station, which may have power control circuitry similar to that shown for the base station, establishes the signal to interference ratio (SIR) of the received signal. In dependence on the SIR, the mobile unit generates a PWC bit #2 to be sent with its next transmission signal, which instructs the base station transmitter to increase/reduce its output power level accordingly.

The return signal, comprising data and PWC bit #2 is transmitted by the mobile station and received by the receiver in the base station. The signal is decoded (despread) into the data and the PWC bit #2. The value of the PWC bit #2 is used to adjust the gain of the power amplifier 6 in accordance with its value.

The despread signal is fed to the SIR unit which determines the SIR of the received signal. The output of the SIR unit is fed to the bit adjuster 84 which adjusts the value of the PWC bit #1, to be transmitted back to the mobile station, in dependence on the SIR.

In this manner, the power levels of the signals transmitted by the BTS and the mobile station are controlled such that the received signals are always at an appropriate level for reception.

Such a method is only applicable to systems involving two separate transceiver stations, in this case a base station transceiver and a mobile station transceiver, where the BTS transmitter transmits a first PWC bit (#1) which controls the output power level of the MS transceiver and then the MS transmitter transmits a second PWC bit (#2) which controls the output power level of the BTS transceiver.

Clearly, this method of controlling the output power levels cannot be applied during the test loop operation described above since there is no MS transceiver involved. The test signal is transmitted by the BTS transmitter and is received by the BTS receiver. The received PWC bit #2, therefore, will be identical to the transmitted PWC bit #1 and would not reflect the SIR of the test sample on the receive side.

To allow power control in a test configuration, a connection is provided between the memory 82 holding PWC bit #1 and the PWC bit #2 used to adjust the transmitter level. Connection and disconnection is achieved by means of the, switch 86 which is controlled by the test mode controller 88.

In operation, the data and the PWC bit #1 of the test signal are multiplexed, up-converted, amplified and transmitted in the manner described above. The transmitted test signal is sampled and fed ($f_{TX}$) to the receiver section of the transmitter by means of the coupler 50 as before.

The test sample is converted to the receiver band and then down-converted to base-band frequencies. The sample is fed to the rake receiver 74 which despreads the signal into the data component and the PWC bit #2. In the test operation, of course, the received PWC bit #2, i.e. the PWC bit of the sample, is the same as the PWC bit #1 of the transmitted signal.

This value of PWC bit #2 is of no relevance during testing since it does not represent an instruction from another transceiver to adjust its output power level.

Thus, during a test, PWC bit #2 is not used to control the adjustable power amplifier 6. Instead, the switch 86 is opened by the test mode controller 88 to supply the adjusted bit held in the memory 82 to the memory 80. It will be recalled that the adjusted bit held in memory 82 represents the SIR determined by the SIR unit 76 of the received signal, in this case the test sample. Thus, that value does reflect the required power level conditions for the test signal. By supplying that value into the memory 80, that value can then be used to adjust the power amplifier 6 in the test loop.

In this manner, power control is achieved in a simple and uncomplicated fashion.

We claim:

1. Test circuitry for a transceiver comprising:
   a transmitter for transmitting a test signal incorporating a test spreading code;
   a receiver for receiving said test signal, said receiver including detecting means set up in accordance with said test spreading code for detecting whether or not signals received by the receiver include the test signal incorporating said test spreading code; and
   a coupler connected to the transmitter for feeding back a test sample of the test signal to the receiver.

2. Test circuitry according to claim 1, wherein said detecting means set up according to the test spreading code includes a matched filter.

3. Test circuitry according to claim 2, wherein the detecting means comprises detector circuitry connected to receive the output of the matched filter and to detect that a match has been found between signals received by the receiver and the test signal when an output is generated above a predetermined threshold level.

4. Test circuitry according to claim 1, which includes a test controller for generating said test spreading code for incorporation in the test signal and for setting up the detecting means with said test spreading code.

5. Test circuitry according to claim 1, wherein the receiver comprises an attenuator for attenuating the fed-back test sampler.

6. Test circuitry according to claim 1, which includes power adjustment means for adjusting the power level of the test signal.

7. Test circuitry according to claim 6, wherein the power adjustment means is controlled responsive to a power control signal established by determining the signal to information ratio of the test sample received by the receiver.

8. A method of carrying out a test in a transceiver, the method comprising:
   at the transceiver applying a test spreading code to a test signal and transmitting said test signal;
   feeding back a test sample of said test signal to a receiver located in said transceiver;
   at the receiver, setting up a detector in accordance with said test spreading code; and
   detecting whether or not said test sample includes said test signal by checking for a match at said detector.

9. A transceiver for implementing a test loop, the transceiver comprising:
   a transmitter for transmitting a test signal;
   a receiving mixer for converting the test signal from a transmitting frequency to a receiving frequency;
   a local oscillator for generating a conversion signal for the mixer;
   a first power adjustment means for adjusting the power level of the received test signal prior to conversion of the mixer; and
   a second power adjustment means for adjusting the power level of the test signal to be transmitted based on the signal to information ratio of the received test signal.

10. A transceiver according to claim 9, which further comprises despreading means for despreading the test signal to which a spreading code has been applied.

* * * * *